UNITED STATES PATENT OFFICE.

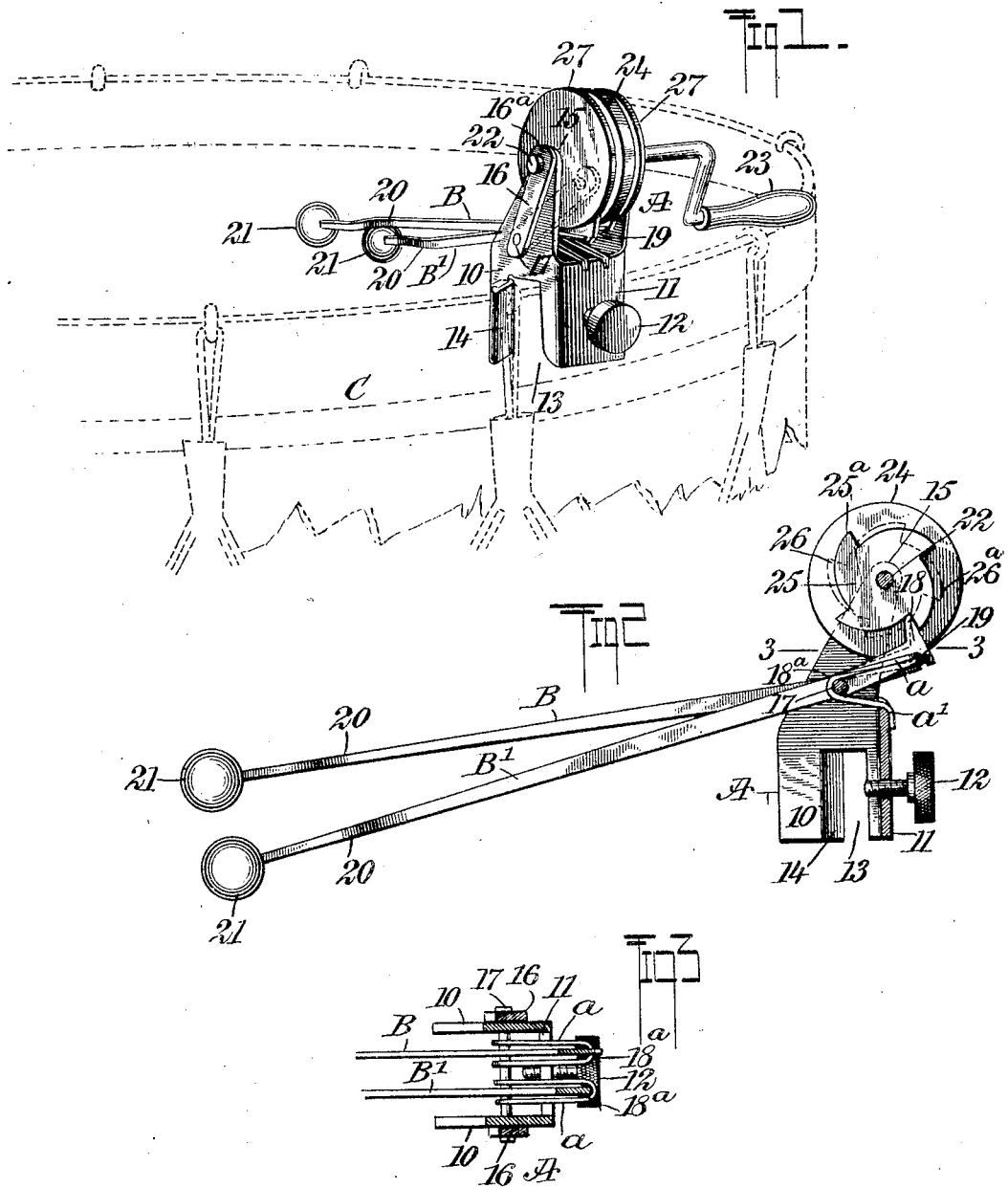

ATHERTON D. CONVERSE, OF WINCHENDON, MASSACHUSETTS.

DRUM-BEATER.

No. 800,552.           Specification of Letters Patent.           Patented Sept. 26, 1905.

Application filed December 15, 1904. Serial No. 237,015.

*To all whom it may concern:*

Be it known that I, ATHERTON D. CONVERSE, a citizen of the United States, and a resident of Winchendon, in the county of Worcester and State of Massachusetts, have invented a new and Improved Drum-Beater, of which the following is a full, clear, and exact description.

The purpose of the invention is to provide simple mechanism for controlling the operation of drumsticks relative to the head of a drum or other surface to be beaten upon, which mechanism can be conveniently operated to produce taps of all descriptions given to a drum and which are usually produced by a drummer holding the sticks in the hand.

A further purpose of the invention is to provide a simple device for the purpose described and one which can be conveniently operated and readily applied and secured to the chime of a drum and as readily removed therefrom.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the device, illustrating it as applied to a drum, the drum appearing in dotted lines. Fig. 2 is a central vertical section through the device, and Fig. 3 is a horizontal section taken practically on the line 3 3 of Fig. 2.

The frame A consists of cheek-pieces 10, connected at the lower portions of their longitudinal edges by a rear plate 11, having a threaded opening therein through which a thumb-screw 12 is passed. At the lower end of each cheek-piece 10 of the frame a longitudinal opening 13 is produced, and at the inner longitudinal edges of said openings outwardly and forwardly extending wings 14 are formed, while at the upper ends of the cheek-pieces open bearings 15 are made, adapted when used to be closed by the hooked upper ends $16^a$ of arms 16, pivoted to the outer faces of the cheek-pieces 10, the pivots for the arms being below the bearings and at one side of a line drawn through the center of the bearings, as is shown in Fig. 1. A pin 17 is secured in the cheek-pieces 10, extending from one to the other, which pin in the drawings is shown as located to the front of and slightly above the upper edge of the rear plate 11. Drumsticks B and B' are loosely mounted near their rear ends upon the pin 17, as shown in Figs. 2 and 3, and at their extreme rear ends are provided with upwardly-extending spurs or projections 18, having straight rear faces and curved or inclined front faces, as is illustrated in Fig. 2. The rear ends of the drumsticks B and B' rest upon springs $18^a$, which must be pressed down and placed under tension when the forward or striking ends of the sticks are elevated. These springs are preferably of the form shown in Figs. 2 and 3, wherein it will be observed that the wire of which the spring is constructed is bent upon itself to form an elongated open loop $a$, which extends upwardly from the pin 17, and the wire is then carried forward and loosely around the pin and then rearwardly beneath the loop $a$, forming a shank $a'$, and the free ends of the shank have bearing upon the upper edge of the back plate 11, while the rear or closed end of the loop $a$ enters a recess 19 in the lower end portion of a drumstick, as is shown in both Figs. 1 and 2. Heads 21 of circular or of any desired shape are provided for the forward ends of the drumsticks B and B', and the forward end portions 20 of the drumsticks are more or less outwardly bent, as shown in Fig. 1, but permit the heads 21 to pass each other when the sticks are in action. It will be observed that the springs $18^a$ tend to force the sticks B and B' to a downward and forward position, as shown in Fig. 2.

The drumsticks are operated by the following mechanism: A shaft 22 is journaled in the open bearings 15 and is locked in place by the arms 16. The shaft 22 extends some distance beyond the right-hand cheek-piece 10 of the frame A and terminates in a crank-handle 23, as is shown in Fig. 1; but the said shaft at its right-hand end may be provided with a hand-wheel instead of with a crank-handle. Between the cheek-pieces of the frame A a disk 24 is securely fastened on the shaft 22, and toothed or ratchet wheels 25 and 26 are secured to or are made integral with opposite sides of the disk. The teeth $25^a$ of the ratchet-wheel 25 are in staggered relation to the teeth $26^a$ of the ratchet-wheel 26, as is shown in Fig. 2. Each tooth of each ratchet-wheel has a long curved peripheral edge and a straight diametrical edge, and the latter in the working position of a tooth faces forward, as is shown in Fig. 2. The spurs 18 at the rear ends of the drumsticks B and B' are adapted to engage with the toothed portions of the ratchet-wheels 25 and 26. In the drawings the spur extending from the drumstick B engages with the teeth 26ᵃ of the ratchet-wheel 26 and the spur 18 from the drumstick B' engages with the teeth 25ᵃ of the ratchet-wheel 25. In order that the said spurs shall be prevented from leaving the teeth of the respective ratchet-wheels with which they engage, guide-disks 27 are secured to the said shaft 22—one at the outer face of each ratchet-wheel—so that the spurs 18 operate between the guide-disk 27 and that portion of the main disk 24 which extends beyond the peripheries of the ratchet or toothed wheels.

In operation the frame A is placed upon the chime of the drum, the chime being made to enter the opening 13 in the cheek-pieces of the frame, thus bringing the wings 14 to a bearing against the inner face of the chime and the thumb-screw against the outer face of the chime, so that by tightening up on the thumb-screw 12 the frame of the device is firmly held in position on the drum with the drumsticks over the head of said drum. The normal position of the drumsticks is with the head of one stick in engagement with the head of the drum and the head of the other stick slightly raised above the head of the drum, as is indicated in Figs. 1 and 2. It is therefore obvious that when the shaft 22 is rapidly turned the sticks are alternately raised and lowered, and therefore a roll will be sounded on the drum-head, and that according to the movement of the shaft 22 being made regular, irregular, or spasmodic the character of the taps may be changed as required, it being possible with the said device applied to a drum to produce any of the numerous calls or taps which can be produced by a drummer in the ordinary manner.

The operation of the device is very apparent from Fig. 2, as when the shaft 22 is turned in one direction and the curved edge of a tooth is in engagement with the spur 18 of a drumstick where the said curved edge joins the straight edge of an adjacent tooth the spur will ride upon the curved or cam edge of the tooth and will be forced downward against the pressure of the spring 18ᵃ belonging to the particular drumstick carrying the spur, and the head of the said drumstick will be gradually raised until the straight or diametrical face of the tooth is reached, whereupon the spur will be forced upward by the spring controlling it and the spur will engage with the lowest peripheral edge of the next tooth, thereby permitting the head of the drumstick carrying that particular spur to engage with the drumhead and produce a sound, and at just about the time that the drumstick above referred to is permitted to engage with the drumhead the other spur will have acted upon the other drumstick to raise its head from the drum, so that the drumsticks are alternately raised and lowered, and the movement of the drumsticks may be rapid or slow, according to the speed imparted to the shaft 22, and the intervals between the strokes are regulated by the length of the curved surfaces of the teeth, and the time of action between the two drumsticks is regulated by the distance that the teeth of one wheel is advanced beyond the teeth of the other wheel.

I desire it to be understood that the operating mechanism for the device need not be rotary, as illustrated, as such mechanism may be of a reciprocating nature, and I do not confine myself to the use of two drumsticks, as a single stick may be operated to give almost as good an effect as two sticks, and, further, I contemplate the employment of more than two sticks.

The device may be permanently secured to the drum, if desired, and the means of attachment of the device to the drum may be varied, and likewise the character of the springs, without departing from the spirit of the invention.

Having thus described my invention, I claim as new and desire to secure by Letters Patent—

1. A drum-beater, comprising a frame, means for attaching the frame to the chime of a drum, drumsticks pivoted in the said frame near their rear ends, springs acting on the rear ends of the drumsticks to elevate the same, upward projections from the rear ends of the drumsticks, a shaft mounted to revolve in the frame above the drumsticks, ratchet-wheels secured on the said shaft, the teeth of which wheels engage with the said projections, the teeth of one ratchet-wheel being in staggered arrangement with relation to the teeth of the opposing ratchet-wheel.

2. In a drum-beater, a frame, means for attaching the frame to the chime of a drum, a pin secured in the said frame, drumsticks pivoted at their rear ends on the said pin, springs located at the said pin, having bearing on the frame and bearing against the under edge of the rear ends of the drumsticks, upward projections from the rear ends of the drumsticks, which projections have straight rear faces and curved forward faces, a shaft journaled in the frame above the drumsticks, means for rotating the said shaft, ratchet-wheels secured on the said shaft, the teeth of the ratchet-wheels being adapted to engage with the projections from the drumsticks, the teeth of the ratchet-wheels being provided with curved peripheral edges and straight diametrical edges and the teeth on one ratchet-wheel being in staggered relation to the teeth on the opposing ratchet-wheel.

3. In a drum-beater, a frame, means for attaching the frame to the chime of a drum, a pin secured in the said frame, drumsticks pivoted at their rear ends on the said pin, springs located at the said pin, having bearing on the frame and bearing against the under edge of the rear ends of the drumsticks, the springs acting to raise the said rear ends of the drumsticks, upward projections from the rear ends of the drumsticks, which projections have straight rear faces and curved forward faces, a shaft journaled in the frame above the drumsticks, means for rotating the said shaft, ratchet-wheels secured on the said shaft, the teeth of the ratchet-wheels being adapted to engage with the projections from the drumsticks, said teeth of the ratchet-wheels being provided with curved peripheral edges and with straight diametrical edges and the teeth on one ratchet-wheel being in staggered relation to the teeth on the opposing ratchet-wheel, a disk secured to the said shaft between the two ratchet-wheels, the disk being of greater diameter than the diameter of the ratchet-wheels, and guide-disks secured also to the said shaft, one opposite the outer face of each ratchet-wheel, the spaces between the central and the outer disks serving as guides for the projections from the drumsticks.

4. In a drum-beater, a support adapted to be secured to the chime of a drum, pivoted and spring-pressed drumsticks in the support, said drumsticks having upwardly-extending members at their rear ends, and ratchet-wheels mounted in the support above the rear ends of the drumsticks and with which the upwardly-extending members of the drumsticks engage, the teeth of the ratchet-wheels having curved peripheral edges and the teeth of one wheel being in staggered arrangement with relation to the teeth of the other.

5. In a drum-beater, a support adapted to be removably secured to a drum, pivoted and spring-pressed drumsticks in the support, said drumsticks having upwardly-projecting members at their rear ends, a shaft mounted in the support above the drumsticks, a disk on the shaft and provided with a ratchet-wheel on each face, and disks secured on the shaft, one adjacent to the outer face of each ratchet-wheel.

6. In a drum-beater, a support constructed for attachment to a drum, drumsticks loosely pivoted near their rear ends on a common pivot in the support, the drumsticks having upwardly-projecting rear ends and recesses in the lower faces of said ends, a looped-shaped spring having its loop engaging the recess in each drumstick, said springs being passed around the pivot of the drumsticks on opposite sides of the sticks and having their shanks engaging the support beneath the loops of said springs, and cam members for engaging the upwardly-projecting members of the drumstick.

7. In a drum-beater, a support comprising spaced and connected cheek-pieces, each having a notched lower edge and a lateral wing on the inner edge of the notch, and a screw in the connecting member of the cheek-pieces, pivoted and spring-pressed drumsticks in the support, and means mounted in the support above the drumsticks for alternately engaging the rear ends of said sticks.

In testimony whereof I have signed my name to this specification in the presence of two subscribing witnesses.

ATHERTON D. CONVERSE.

Witnesses:
    FRANK B. SPALTER,
    HENRY S. ALLEN.